(12) United States Patent
Zhang

(10) Patent No.: US 11,073,062 B2
(45) Date of Patent: Jul. 27, 2021

(54) METHOD FOR OPERATING AN EXHAUST GAS AFTERTREATMENT SYSTEM OF AN INTERNAL COMBUSTION ENGINE WHICH HAS A THREE-WAY PRE-CATALYTIC CONVERTER AND EXHAUST GAS AFTERTREATMENT SYSTEM

(71) Applicant: Vitesco Technologies GMBH, Hannover (DE)

(72) Inventor: Hong Zhang, Tegernheim (DE)

(73) Assignee: Vitesco Technologies GmbH, Hannover (DE)

( * ) Notice: Subject to any disclaimer, the term of this patent is extended or adjusted under 35 U.S.C. 154(b) by 0 days.

(21) Appl. No.: 16/792,477

(22) Filed: Feb. 17, 2020

(65) Prior Publication Data
US 2020/0182121 A1    Jun. 11, 2020

Related U.S. Application Data

(63) Continuation of application No. PCT/EP2018/071920, filed on Aug. 13, 2018.

(30) Foreign Application Priority Data

Aug. 18, 2017   (DE) ..................... 10 2017 214 448.3

(51) Int. Cl.
*F01N 3/10*     (2006.01)
*F01N 3/20*     (2006.01)
(Continued)

(52) U.S. Cl.
CPC .............. *F01N 11/00* (2013.01); *F01N 3/101* (2013.01); *F01N 3/105* (2013.01); *F01N 3/2006* (2013.01);
(Continued)

(58) Field of Classification Search
CPC ........ F01N 3/101; F01N 3/105; F01N 3/2006; F01N 11/00; F01N 13/0093;
(Continued)

(56) References Cited

U.S. PATENT DOCUMENTS 4,404,804 A * 9/1983 Tadokoro ................ F02B 37/18
60/602
5,426,934 A    6/1995 Hunt et al.
(Continued)

FOREIGN PATENT DOCUMENTS

CN        1415045 A       4/2003
CN      102782271 A      11/2012
(Continued)

OTHER PUBLICATIONS

International Search Report and Written Opinion dated Oct. 1, 2018 from corresponding International Patent Application No. PCT/EP2018/071920.
(Continued)

*Primary Examiner* — Audrey B. Walter

(57) ABSTRACT

A method for operating an exhaust gas aftertreatment system of an internal combustion engine and an exhaust gas aftertreatment system are described. The internal combustion engine has a turbine wheel, which is arranged in the exhaust gas line, of an exhaust gas turbocharger, and a bypass line which bypasses the turbine wheel and in which a three-way pre-catalytic converter is arranged. A three-way main catalytic converter is situated in the exhaust gas line. A NOx sensor is provided which measures the NOx fraction in the exhaust gas downstream of the three-way pre-catalytic converter. If the measured NOx fraction exceeds a threshold value, the three-way pre-catalytic converter is diagnosed as faulty.

10 Claims, 2 Drawing Sheets

(51) Int. Cl.
*F01N 11/00* (2006.01)
*F01N 13/00* (2010.01)
*F02B 37/18* (2006.01)

(52) U.S. Cl.
CPC .......... *F01N 13/0093* (2014.06); *F02B 37/18* (2013.01); *F02B 37/183* (2013.01); *F01N 2410/00* (2013.01); *F01N 2550/02* (2013.01); *F01N 2560/025* (2013.01); *F01N 2560/026* (2013.01)

(58) Field of Classification Search
CPC ............. F01N 2410/00; F01N 2550/02; F01N 2560/025; F01N 2560/026; F02B 37/18; F02B 37/183
See application file for complete search history.

(56) References Cited

U.S. PATENT DOCUMENTS

| | | | |
|---|---|---|---|
| 6,519,931 B2 * | 2/2003 | Fujieda | F01N 3/20 60/280 |
| 8,763,365 B2 | 7/2014 | Ishibashi et al. | |
| 9,599,055 B2 | 3/2017 | Kitaura et al. | |
| 2002/0144502 A1 | 10/2002 | Beer et al. | |
| 2012/0185157 A1 | 7/2012 | Tsunooka | |
| 2016/0025026 A1 | 1/2016 | Kitaura et al. | |

FOREIGN PATENT DOCUMENTS

| | | | | |
|---|---|---|---|---|
| CN | 105317511 A | | 2/2016 | |
| DE | 19931321 A1 | | 1/2001 | |
| DE | 10014239 A1 | | 10/2001 | |
| DE | 10319983 B3 | | 8/2004 | |
| DE | 10332057 A1 | | 2/2005 | |
| DE | 102010043327 A1 | * | 5/2012 | ............. F01N 3/101 |
| DE | 102010043327 A1 | | 5/2012 | |
| EP | 3103992 A1 | | 12/2016 | |
| JP | S63316576 A | | 12/1988 | |
| JP | 05321643 A | * | 12/1993 | ........... F01N 13/009 |
| JP | H0771234 A | | 3/1995 | |
| JP | 2012026406 A | * | 2/2012 | |

OTHER PUBLICATIONS

Chinese Office Action dated Apr. 2, 2021 for corresponding Chinese Patent Application No. 201880053524.3.

* cited by examiner

METHOD FOR OPERATING AN EXHAUST GAS AFTERTREATMENT SYSTEM OF AN INTERNAL COMBUSTION ENGINE WHICH HAS A THREE-WAY PRE-CATALYTIC CONVERTER AND EXHAUST GAS AFTERTREATMENT SYSTEM

CROSS-REFERENCE TO RELATED APPLICATIONS

This application claims the benefit of PCT Application PCT/EP2018/071920, filed Aug. 13, 2018, which claims priority to German Application DE 10 2017 214 448.3, filed Aug. 18, 2017. The disclosures of the above applications are incorporated herein by reference.

TECHNICAL FIELD

The disclosure relates to a method for operating an exhaust gas aftertreatment system of an internal combustion engine which has an exhaust gas line; a turbine wheel, which is arranged in the exhaust gas line, of an exhaust gas turbocharger; a bypass line which bypasses the turbine wheel and which has a bypass valve; a three-way pre-catalytic converter arranged in the bypass line; and a three-way main catalytic converter arranged in the exhaust gas line.

BACKGROUND

Internal combustion engines are known. A bypass line which bypasses a turbine wheel of the exhaust gas turbocharger and which has a bypass valve is provided here in order to be able to put the turbocharger into or out of operation by opening or closing the bypass valve. One way or another, the exhaust gas flow of the internal combustion engine impinges the three-way main catalytic converter which is arranged in the exhaust gas line and in which carbon monoxide, nitrogen oxides and unburnt hydrocarbons which are contained in the exhaust gas are converted to carbon dioxide, nitrogen and water. In particular, the conversion of the nitrogen oxides into nitrogen plays a particular role here.

In addition to such a three-way main catalytic converter, such an internal combustion engine frequently has a three-way pre-catalytic converter which is arranged in the bypass line of the turbocharger and by means of which the exhaust gas flowing through the bypass line is purified. A corresponding conversion of carbon monoxide, nitrogen oxides and unburnt hydrocarbons to carbon dioxide, nitrogen and water occurs with this three-way pre-catalytic converter, too. When the bypass line is in operation, the exhaust gas flowing through the bypass line is therefore subjected to a purification operation both in the three-way pre-catalytic converter and in the three-way main catalytic converter.

The above-described three-way catalytic converters are fully functional only at a light-off temperature, with the result that they have to be heated up as quickly as possible after the starting of the internal combustion engine in order to reach their operating temperature (light-off temperature). It is therefore known to provide heating-up measures in order to bring such three-way catalytic converters to their optimal operating temperature.

SUMMARY

The disclosure provides a method of the type described at the outset that allows substantially fault-free operation of the three-way pre-catalytic converter.

One aspect of the disclosure provides a method that includes providing a NOx sensor in the bypass or exhaust gas line downstream of the three-way pre-catalytic converter and upstream or downstream of the three-way main catalytic converter, and measuring the NOx emissions in the exhaust gas by the NOx sensor. The method also includes diagnosing the three-way pre-catalytic converter as faulty if the measured NOx emissions lie above a threshold value.

The current disclosure therefore provides a method with which it can be diagnosed whether the three-way pre-catalytic converter provided in the bypass line functions correctly or not. For this purpose, the method uses a NOx sensor which measures the NOx fraction in the exhaust gas downstream of the three-way pre-catalytic converter. If a threshold value is exceeded here, for example 100 ppm, the three-way pre-catalytic converter is assessed as faulty. Otherwise, the three-way pre-catalytic converter is classified as functioning correctly.

It will be understood that the method is carried out only when the bypass line is in operation, that is to say exhaust gas flows through the three-way pre-catalytic converter. When the bypass valve provided blocks off the bypass line and the exhaust gas flow takes the path via the turbine wheel of the exhaust gas turbocharger to the three-way main catalytic converter, the diagnosis is not carried out by the NOx sensor.

Implementations of the disclosure may include one or more of the following optional features. In some implementations, both the NOx emissions and the lambda value are measured by the NOx sensor provided.

In order for such three-way catalytic converters to function correctly and ensure a high degree of conversion of the pollutants, in exhaust gas aftertreatment systems of the prior art the combustion air ratio lambda is maintained in a narrow range around lambda=1 with the aid of a control circuit with lambda sensor since, upon deviation from the stoichiometric air-fuel ratio to a lean mixture of lambda>1, not all the nitrogen oxides are degraded because excess oxygen is present. In the method according to the disclosure, the corresponding lambda value of the exhaust gas is now also measured by the NOx sensor in order to be able to carry out the diagnosis of the three-way pre-catalytic converter in an optimal range around lambda=1. The diagnosis is therefore carried out here only when lambda lies in this range.

For corresponding exhaust gas purification, it is of importance that the pollutants, here NOx, are reduced both before and after reaching the light-off temperature of the three-way pre-catalytic converter. The three-way pre-catalytic converter must therefore function correctly in both cases. In particular here, it must also be diagnosed in the phase up until reaching the light-off temperature, that is to say during the heating-up phase of the catalytic converter, whether correct functioning is present. In some examples, the measurements are therefore carried out by the NOx sensor particularly during the heating-up phase of the three-way pre-catalytic converter.

Here, in some examples, after a defined time period for lighting-off of the three-way pre-catalytic converter, the lambda value is measured downstream of the three-way pre-catalytic converter and, upon determining that it lies in the range of lambda=1, the NOx emissions are measured and the diagnosis is carried out. If it is determined here that a threshold value is exceeded (in dependence on or as a function of the air mass flow), the three-way pre-catalytic converter is classified as faulty.

In some examples, the total NOx emissions are calculated from the measured NOx emissions by integration of the NOx concentration with respect to the air mass flow. In this case, the method may also be carried out during the heating-up phase of the three-way pre-catalytic converter up until reaching its light-off temperature or immediately thereafter. If the calculated total value lies above a threshold value, the three-way pre-catalytic converter can be diagnosed as faulty.

Another aspect of the disclosure provides an exhaust gas aftertreatment system of an internal combustion engine which has an exhaust gas line; a turbine wheel, which is arranged in the exhaust gas line, of an exhaust gas turbocharger; a bypass line which bypasses the turbine wheel and which has a bypass valve; a three-way pre-catalytic converter arranged in the bypass line; and a three-way main catalytic converter arranged in the exhaust gas line. A NOx sensor is arranged in the bypass or exhaust gas line downstream of the three-way pre-catalytic converter and upstream or downstream of the three-way main catalytic converter. The corresponding exhaust gas aftertreatment system is designed to carry out the above-described method.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
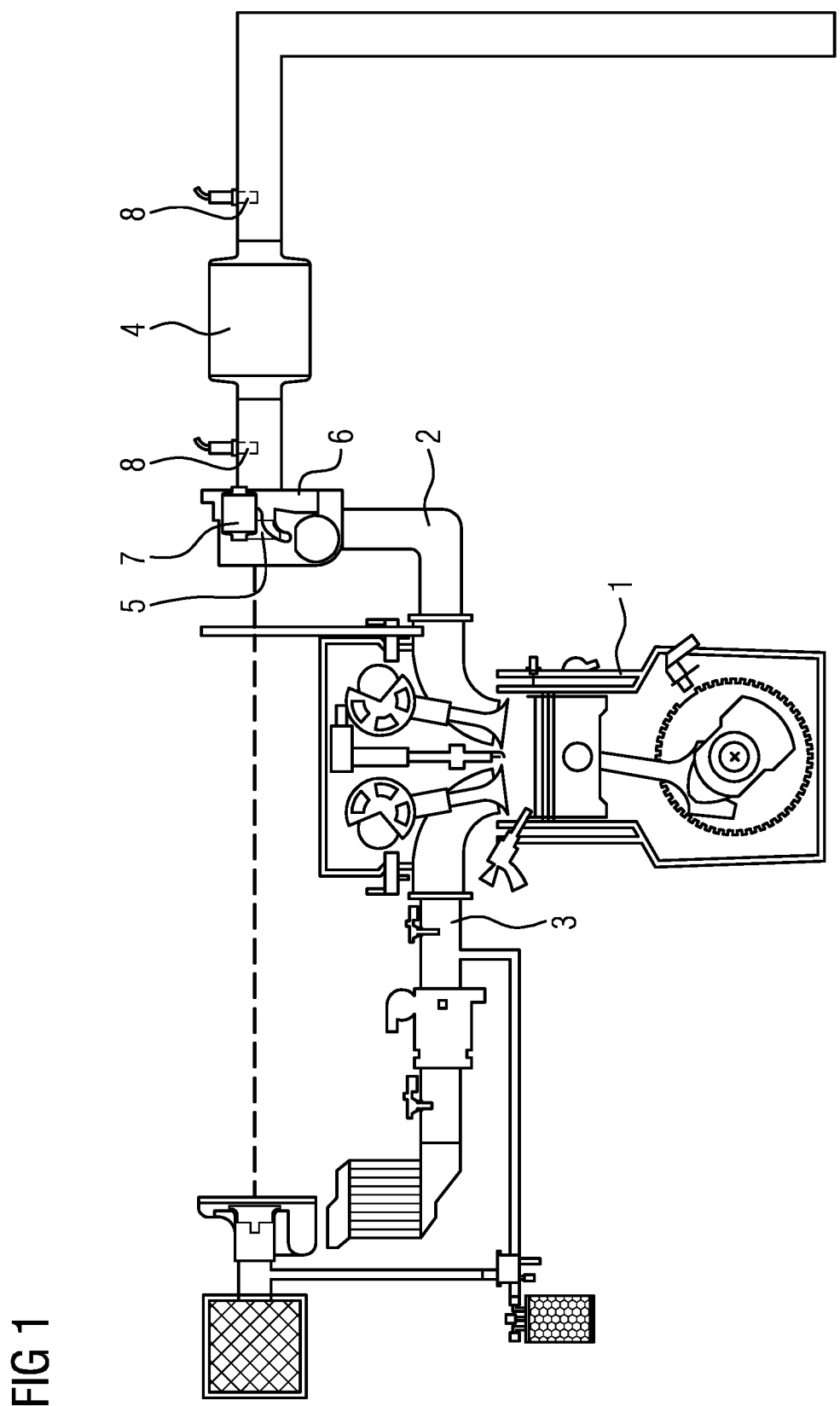
FIG. 1 shows a schematic illustration of an exhaust gas aftertreatment system of an internal combustion engine.

The internal combustion engine schematically illustrated in FIG. 1 is a gasoline engine which has a standard air supply tract 3 and exhaust gas tract with an exhaust gas line 2. The internal combustion engine 1 is provided with an exhaust gas turbocharger which has a turbine wheel 5 which is arranged in the exhaust gas line 2.

Figure 2:
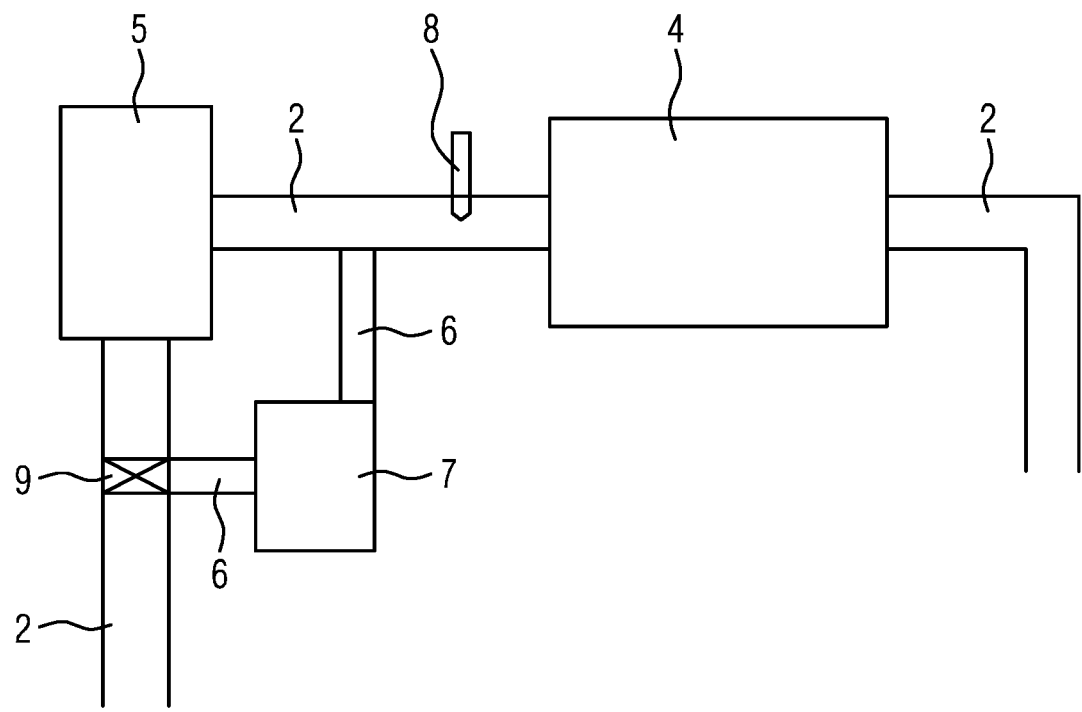
FIG. 2 shows a schematic enlarged illustration of part of the exhaust gas aftertreatment system of FIG. 1.

As illustrated in FIG. 2, this turbine wheel 5 is bypassed by a bypass line 6 in which a three-way pre-catalytic converter 7 is situated. The exhaust gas flow is controlled via a bypass valve 9 in such a way that it either passes through the turbine wheel 5 via the exhaust gas line 2 or flows through the bypass line 6.

A three-way main catalytic converter 4 is situated downstream of the bypass line 6 in the exhaust gas line 2 and carries out corresponding exhaust gas purification in a known manner. As shown in FIG. 1, a NOx sensor 8 is arranged upstream or downstream of the three-way main catalytic converter 4. In FIG. 2, this sensor 8 is here shown only upstream of the three-way main catalytic converter 4.

The NOx sensor 8 diagnoses the three-way pre-catalytic converter 7 arranged in the bypass line 6. The functionality of this catalytic converter is checked thereby. This occurs by virtue of the fact that, with the aid of the NOx sensor 8, the NOx fraction in the exhaust gas is measured downstream of the three-way pre-catalytic converter 7 and the lambda value of the exhaust gas is measured downstream of the three-way pre-catalytic converter 7. Specifically, the procedure followed here is as follows:

Function checking of the three-way pre-catalytic converter 7 occurs during its heating-up phase. Following the starting of the engine and after expiry of a certain time period, for example of 10 sec, for reaching the light-off temperature of the three-way pre-catalytic converter 7, the lambda value and the NOx fraction in the exhaust gas are measured by the NOx sensor 8 downstream of the three-way pre-catalytic converter 7. The evaluation of the NOx fraction is carried out at a lambda value of 1 (sensor voltage at 650-750 mV). If the measured NOx emissions in the exhaust gas lie above a defined threshold value, for example above 100 ppm in dependence on or as a function of the air mass flow, the three-way pre-catalytic converter 7 is classified as faulty. If the NOx fraction lies below this threshold value, the three-way pre-catalytic converter 7 is considered to be functional.

A number of implementations have been described. Nevertheless, it will be understood that various modifications may be made without departing from the spirit and scope of the disclosure. Accordingly, other implementations are within the scope of the following claims.

LIST OF REFERENCE SIGNS

1 Internal combustion engine
2 Exhaust gas line
3 Air supply tract
4 Three-way main catalytic converter
5 Turbine wheel
6 Bypass line
7 Three-way pre-catalytic converter
8 NOx sensor
9 Bypass valve

What is claimed is:

1. A method for operating an exhaust gas aftertreatment system of an internal combustion engine which has an exhaust gas line, a turbine wheel, arranged in the exhaust gas line, of an exhaust gas turbocharger, a bypass line, bypassing the turbine wheel and having a bypass valve, a three-way pre-catalytic converter arranged in the bypass line, and a three-way main catalytic converter arranged in the exhaust gas line, the method comprising:
   providing a NOx sensor in the exhaust gas line downstream of the three-way main catalytic converter;
   measuring NOx emissions in the exhaust gas by the NOx sensor; and
   diagnosing the three-way pre-catalytic converter as faulty if the measured NOx emissions lie above a threshold value.

2. The method as claimed in claim 1, wherein the NOx emissions and a lambda value are measured by the NOx sensor.

3. The method as claimed in claim 2, wherein after a defined time period for lighting-off of the three-way pre-catalytic converter, the lambda value is measured downstream of the three-way pre-catalytic converter and, at a lambda value in the range of 1, the NOx emissions are measured and the diagnosis of the three-way pre-catalytic converter is carried out.

4. The method as claimed in claim 1, wherein the measurements are carried out during a heating-up phase of the three-way pre-catalytic converter.

5. The method as claimed in claim 1, wherein total NOx emissions are calculated from the measured NOx emissions by integration of a NOx concentration with respect to an air mass flow.

6. An exhaust gas aftertreatment system of an internal combustion engine, the exhaust gas aftertreatment system comprising:
   an exhaust gas line;

a turbine wheel of an exhaust gas turbocharger arranged in the exhaust gas line;

a bypass line bypassing the turbine wheel and having a bypass valve;

a three-way pre-catalytic converter arranged in the bypass line;

a three-way main catalytic converter arranged in the exhaust gas line; and a NOx sensor arranged in the exhaust gas line downstream of the three-way main catalytic converter, the NOx sensor is configured to measure NOx emissions in the exhaust gas, wherein the exhaust gas aftertreatment system is configured to diagnose the three-way pre-catalytic converter as faulty when the measured NOx emissions lie above a threshold value.

7. The exhaust gas aftertreatment system as claimed in claim 6, wherein the NOx sensor is configured to measure the NOx emissions and a lambda value.

8. The exhaust gas aftertreatment system as claimed in claim 7, wherein the exhaust gas aftertreatment system is configured to measure the lambda value is downstream of the three-way pre-catalytic converter after a defined time period for lighting off of the three-way pre-catalytic converter and, at a lambda value in the range of 1, measure the NOx emissions and carry out the diagnosis of the three-way pre-catalytic converter.

9. The exhaust gas aftertreatment system as claimed in claim 7, wherein the exhaust gas aftertreatment system is configured to carry out the measurements during a heating-up phase of the three-way pre-catalytic converter.

10. The exhaust gas aftertreatment system as claimed in claim 7, wherein the exhaust gas aftertreatment system is configured to calculate total NOx emissions from the measured NOx emissions by integration of a NOx concentration with respect to an air mass flow.

\* \* \* \* \*